Patented Feb. 9, 1937

2,070,551

UNITED STATES PATENT OFFICE 2,070,551

CORE COMPOSITION FOR PLASTER BOARD

George D. King, Chicago, Ill., assignor to United States Gypsum Company, Chicago, Ill., a corporation of Illinois No Drawing. Application September 21, 1932, Serial No. 634,147

3 Claims. (Cl. 154—2)

This invention relates to the manufacture of plaster board and has reference more particularly to a composition containing a cementitious material and an agent for creating a firm bond between the paper cover sheets of a plaster board and the core composition, together with the method of manufacturing same.

The present application is a continuation in part of my copending application Serial No. 185,921 filed April 22, 1927, now matured to Patent Number 1,907,982.

In the manufacture of plaster board, wallboard, or other types of gypsum or cementitious boards, it is customary to interpose a plastic composition containing the cementitious material between the paper cover sheets which are being unwound from supply rolls of the paper. Some difficulty has been experienced in securing a firm bond between the paper and core composition, in view of the fact that the plaster boards are passed through a highly heated kiln after the core composition has set to solid form. The high temperature of the kiln, which is maintained in the interest of speed of manufacture, has a tendency to calcine the gypsum in the core and destroy the bond.

An object of this invention therefore is to provide a bonding agent in the plastic composition which will insure complete adhesion between the paper cover sheets and the core of a gypsum board; also to improve composition boards and their methods of manufacture in other respects hereinafter specified and claimed.

I find that by mixing karaya gum in a powdered state with the dry powdered calcined gypsum prior to mixing it with water, a plastic composition is produced which is very efficient in securing a firm adhesion between the set core composition and the paper cover sheets. The karaya gum has a tendency to migrate to the interface between the core and the paper, and to form a film which resists the calcination of the gypsum in the drying kiln at said interface.

I find that by using four pounds of karaya gum per thousand square feet of ⅜" board, good results will be produced, although this amount may be varied with satisfaction from two to eight pounds of karaya gum per thousand square feet of board. If desired the gum may be dissolved in water and added to the plastic mixture as a solution, but it is preferably added in powdered form to the dry stucco prior to mixing with the necessary water for making a plastic mixture. The fineness of the powdered karaya gum should preferably be as follows:

Per cent on 100 mesh_____ Trace
Per cent on 200 mesh_____ Not over 5%
Per cent through 325 mesh_____ 60–75%

The amount of water to be added depends upon the consistency of the gypsum stucco used and may vary from 55 cc. to 100 cc. of water per 100 grams of stucco to give a suitable molding consistency.

Karaya gum is a material classed as a vegetable mucilage and is obtained from certain tropical trees. I find that gum tragacanth is substantially equal in efficiency with karaya gum but it is somewhat more expensive and therefore not as desirable. The karaya gum and gum tragacanth have the unique properties of mixing 1 part by weight of the gum with 50 to 75 parts by weight of water to form a thick, viscous liquid. Other synthetic gums have similar properties.

If desired, a density reducing agent, such as a stable foam, may be added to the plastic mixture along with the required amount of karaya gum in order to produce a board core having a low density and therefore a high heat and sound insulating value. Such a foam may be produced in a manner well known to the art by whipping a solution of soap bark in water or a mixture of casein, rosin soap and water. Sawdust or other organic materials may also be used as density reducing agents, or gas forming agents may be introduced into the mixture.

As a further method of introducing the gum into the composition, a viscous solution of the gum may be whipped into a foam of high density and this foam is then mixed with a stucco-water mix to form a plastic mixture. Preferably a foaming agent such as soap bark should be added to the gum gel prior to whipping into foam. With such a method the gum foam acts both as a bonding agent and as a density reducing agent.

Another way of adding the gum is to make a solution of the gum in water to form a gel and then adding this gel to the stucco-water mixture. Such a gel can be made by slowly adding 1 part of the gum to 50 parts of water while agitating the water at a high speed to prevent lumping.

In the hereunto appended claims, where karaya gum is recited, it is to be understood that equivalents for the karaya gum, such as, for example, gum tragacanth, are to be considered as within the scope of the claims.

I would state in conclusion that while the described examples constitute practical embodiments of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. A composition board comprising a paper cover sheet and a core composed in major part of gypsum, said core containing karaya gum in the proportion of from 2 to 8 pounds of said gum to 1000 square feet of ⅜-inch board.

2. A composition board comprising a paper cover sheet and a gypsum core bonded thereto by means of uncalcined gypsum crystals that penetrate into the cover sheet, said crystals being surrounded and protected by a coating of the residue of a karaya gum gel, the karaya gum being present in the amount of at least 2 pounds thereof to 1000 square feet of ⅜-inch board.

3. The process of making a composition board which comprises incorporating karaya gum with calcined gypsum, producing a plastic mass from the resulting mixture by the addition of water, placing the plastic mass between paper coversheets and permitting the same to set, and then drying the thus formed board at temperatures which are high enough normally to cause partial calcination of the therein contained gypsum but whereby the karaya gum by migration to the interface between the plastic mass core and the cover-sheets surrounds the gypsum crystals there located with a film of karaya gum gel, thereby protecting them against calcination, whereby the strength of the gypsum-crystal-bond between the core and the cover sheets is maintained substantially unimpaired.

GEORGE D. KING.